United States Patent [19]

Comparetta et al.

[11] Patent Number: 5,345,581

[45] Date of Patent: Sep. 6, 1994

[54] PROCESS FOR REPLACING STORAGE MEDIA IN ELECTRONIC PRINTING SYSTEMS

[75] Inventors: Christopher Comparetta, Pittsford; Ronald A. Ippolito, Rochester; Kitty Sathi, Pittsford; Jack T. Latone, Rochester; Colleen R. Enzien, Penfield; Mark A. Smith, Rochester, all of N.Y.

[73] Assignee: Xerox Corporation, Stamford, Conn.

[21] Appl. No.: 678,925

[22] Filed: Apr. 1, 1991

[51] Int. Cl.$^5$ .............................................. G06F 11/00
[52] U.S. Cl. .................. 395/575; 364/DIG. 1; 364/245; 364/245.3; 355/207; 371/10.1
[58] Field of Search ............. 395/575; 364/245, 245.3, 364/246.9, 246.6, 282.2; 355/207; 371/10.1

[56] References Cited

U.S. PATENT DOCUMENTS

| | | | |
|---|---|---|---|
| 4,044,337 | 8/1977 | Hicks et al. | 364/200 |
| 4,654,819 | 3/1987 | Stiffler et al. | 364/900 |
| 4,937,864 | 6/1990 | Caseiras et al. | 380/4 |
| 5,086,502 | 2/1992 | Malcolm | 395/575 |
| 5,136,707 | 8/1992 | Block et al. | 395/600 |
| 5,166,936 | 11/1992 | Ewert et al. | 371/21.6 |

OTHER PUBLICATIONS

Kris Jamsa, DOS: The Complete Reference, 1991 pp. 121–129, pp. 597–602.

*Primary Examiner*—Robert W. Beausoliel, Jr.
*Assistant Examiner*—Phillip F. Vales
*Attorney, Agent, or Firm*—Frederick E. McMullen

[57] ABSTRACT

An electronic printing system with plural hard disks for storing system files with booting process for booting the system to a running condition, the booting process detecting a previously replaced or misplaced disk and in response thereto, enabling booting of the system without loss or re-installing of critical system files.

5 Claims, 22 Drawing Sheets

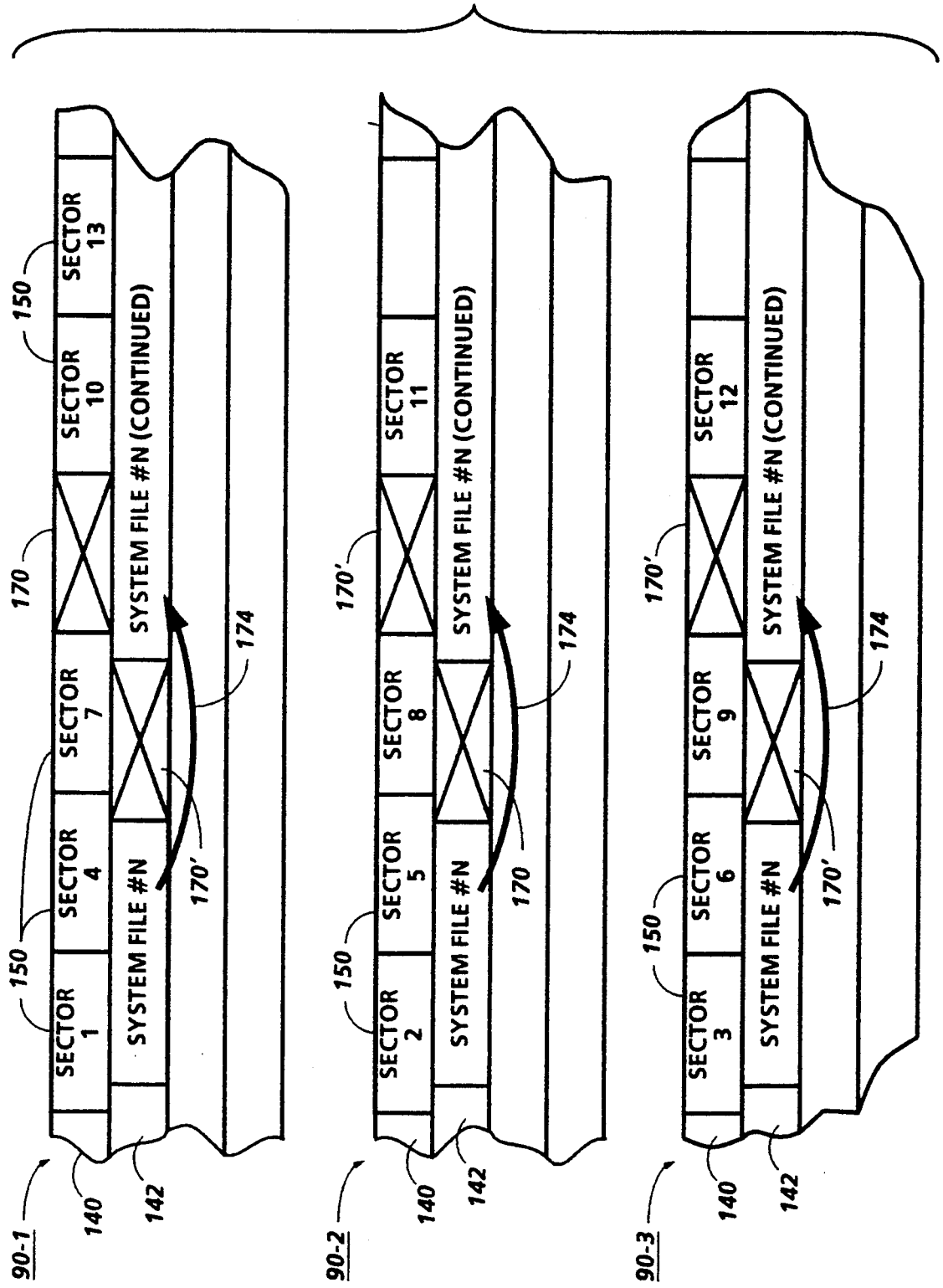

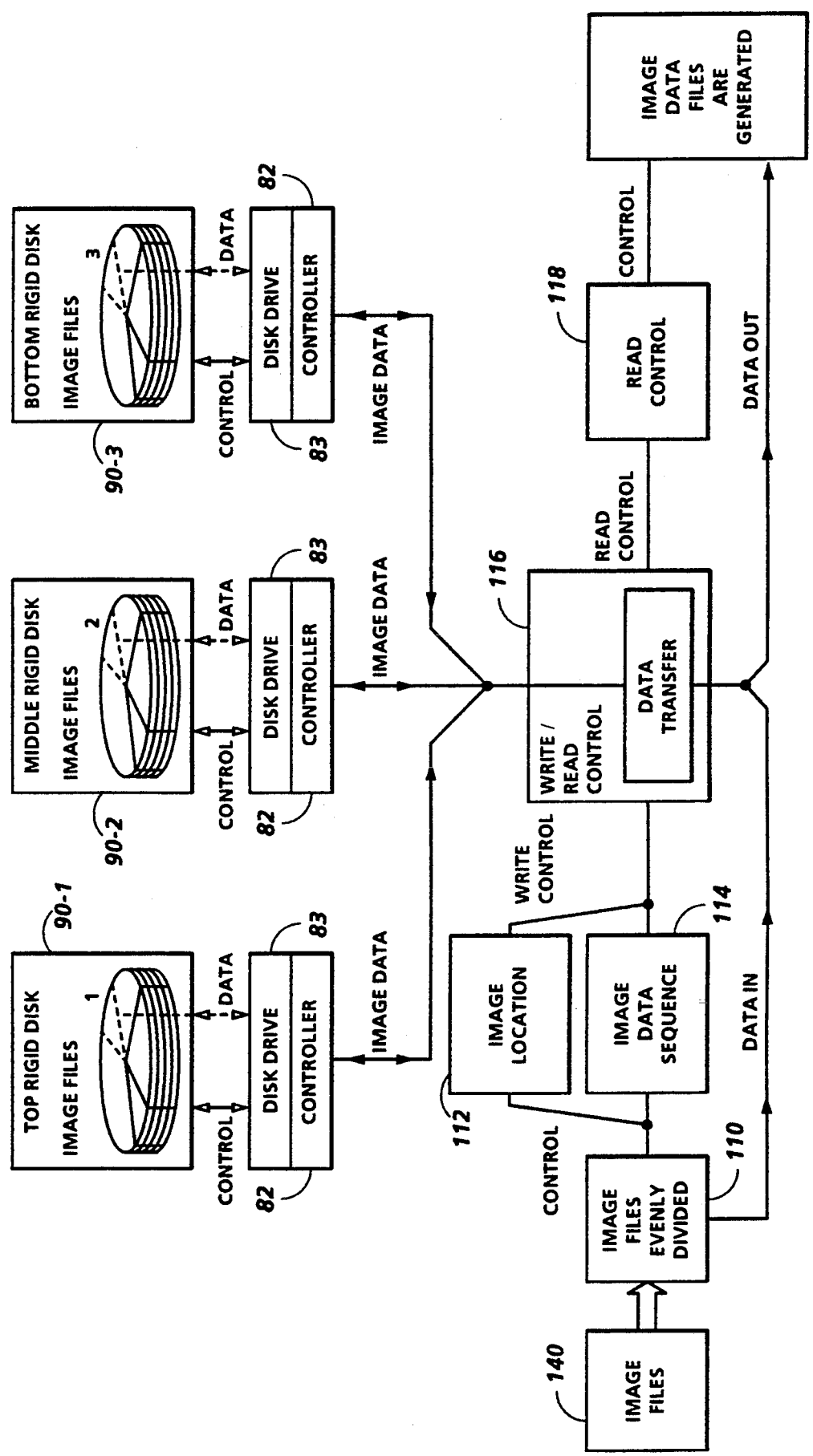

PROCESS FOR REPLACING STORAGE MEDIA IN ELECTRONIC PRINTING SYSTEMS

CROSS REFERENCES TO RELATED APPLICATIONS

The present application is related to the following U.S. Patents and co-pending U.S. Patent Application, which are assigned to the same assignee as is the present application and incorporated by reference herein: U.S. Pat. No. 5,263,152 Smith et al.; U.S. Pat. No. 5,212,786 to Sathi et al.; U.S. Pat. No. 5,257,377 Sathi et al.; U.S. patent application Ser. No. 07/678,926, filed Apr. 1, 1991 to Sathi et al. to "File Storage Process For Electronic Printing Systems Having Multiple Disks"; U.S. Pat. No. 5,241,672 to Slomcenski et al.; and U.S. Pat. No. 5,249,288 to Ippolito et al.

BACKGROUND OF THE INVENTION

The invention relates to electronic printers and printing systems, and more particularly, to a process for replacing the storage media for such systems.

DISCUSSION OF THE PRIOR ART

An important task of the operating system in an electronic printing system is the maintenance of files which are permanent objects recorded on backing storage such as hard disks. Files, which consist of a sequence of pages, comprise system files and image files. The file system provides the operating system with facilities for creating, organizing, reading, writing, modifying, copying, moving, deleting, and controlling access to the files.

System files are considered to be critical since these files are needed in order for the printing system to run. Image files, which are normally derived from scanning documents, are considered to be less critical since these files can be re-constituted by re-scanning the documents from which the image files originated. Because of their criticality, system files cannot be lost if one or more of the disks go bad and needs to be replaced. Further, in the event a disk goes bad and servicing is required, the length of time required to install a new disk at the customer's site must be kept to a minimum.

SUMMARY OF THE INVENTION

While it is known in the prior art to store the operating software for a reproduction machine on a hard disk, as shown in U.S. Pat. No. 4,937,864 to Caseiras et al, there is no disclosure to an electronic printing system having plural disks with files stored on the disks, a process for handling files stored on the disks when replacing a defective one of the disks, the disks having a file allocation table identifying the current location of the files on each of the disks, comprising the steps of: building a list of the files stored on the disks; sorting the files in the list in accordance with the location of the files on the disks; building a temporary file allocation table; allocating new locations to the files on the disks in the temporary allocation table; marking one of the disks as a source disk; moving the files on the source disk to the new locations allocated for the files in the temporary allocation table on the other disks; updating the allocation table associated with the other disks from the temporary allocation table; copying files from the other disk to the source disk; updating the allocation table associated with the source disk; and erasing the temporary allocation table.

DETAILED DESCRIPTION OF THE DRAWINGS

Figure 1:
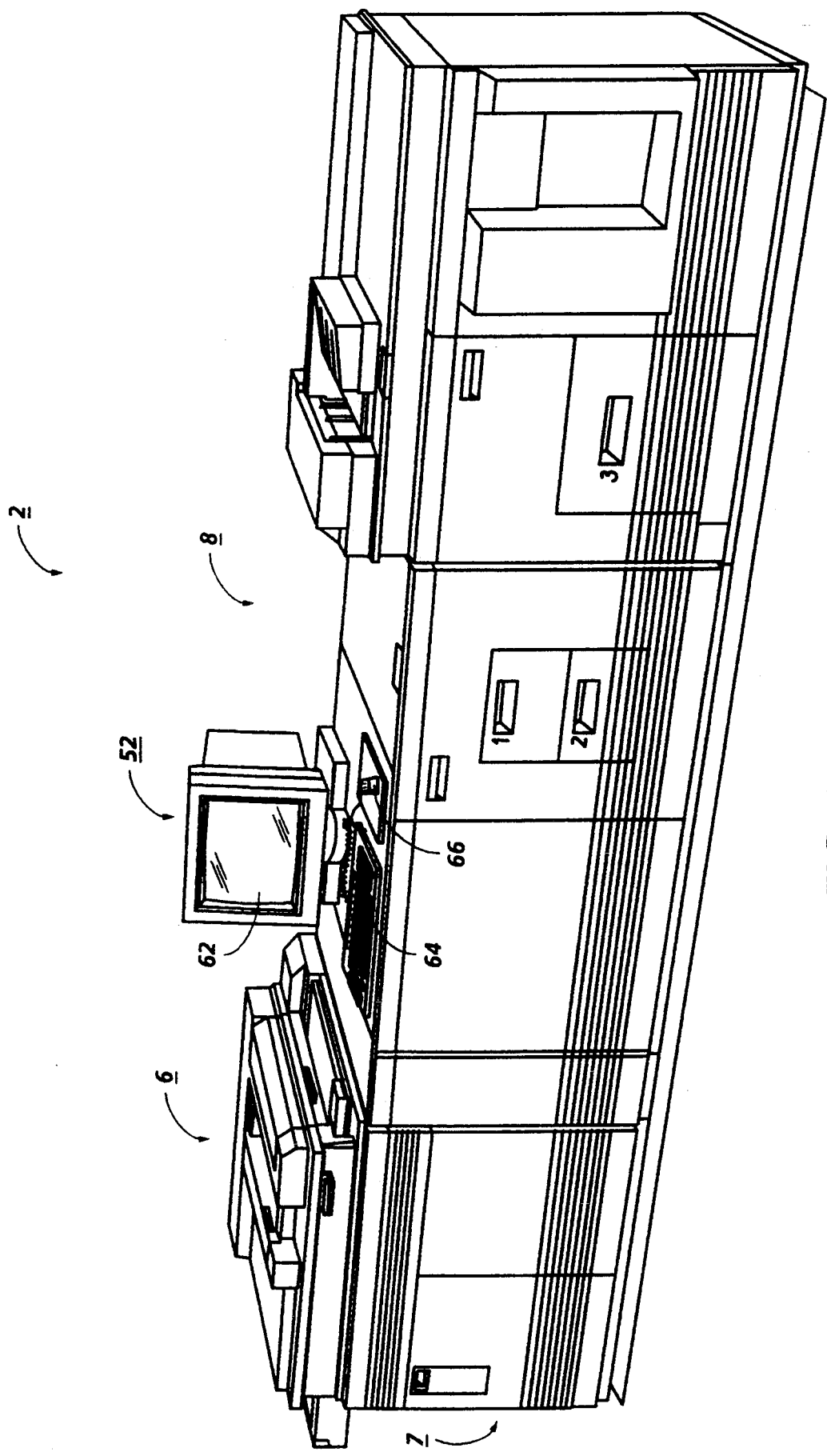
FIG. 1 is a view depicting an electronic printing system incorporating the storage media replacing process of the present invention.
Figure 3A:
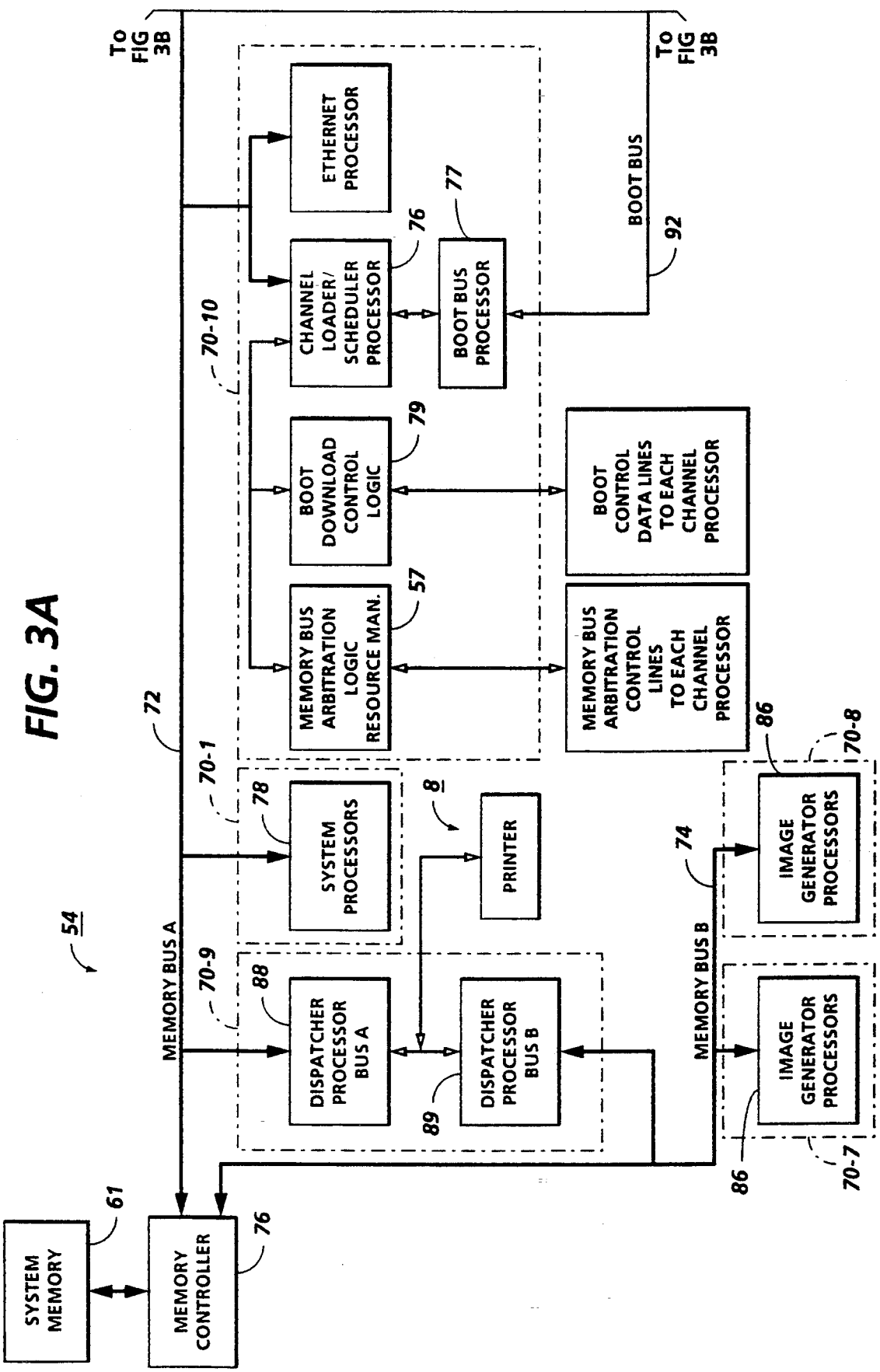
Figure 3B:
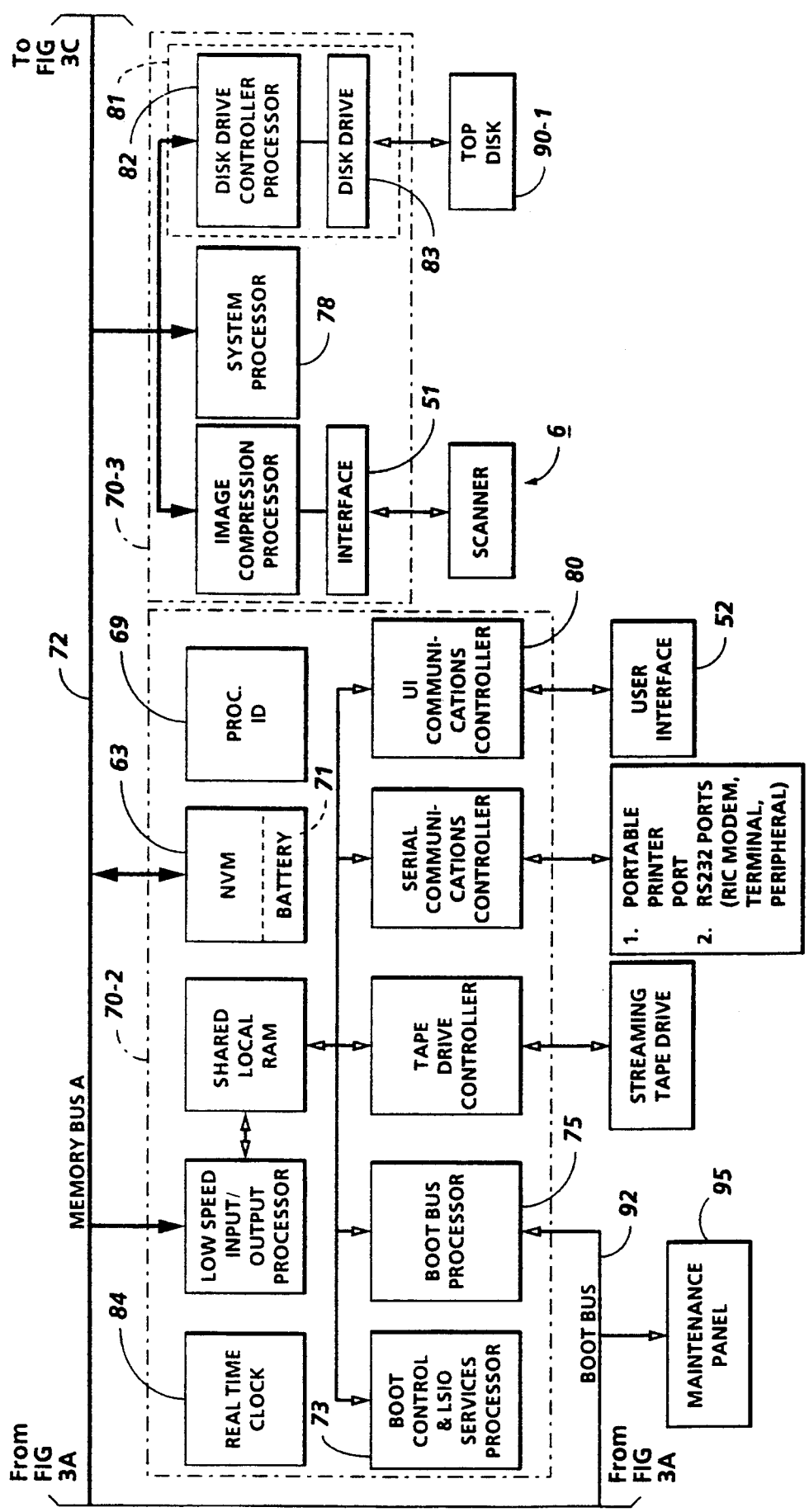
Figure 3C:
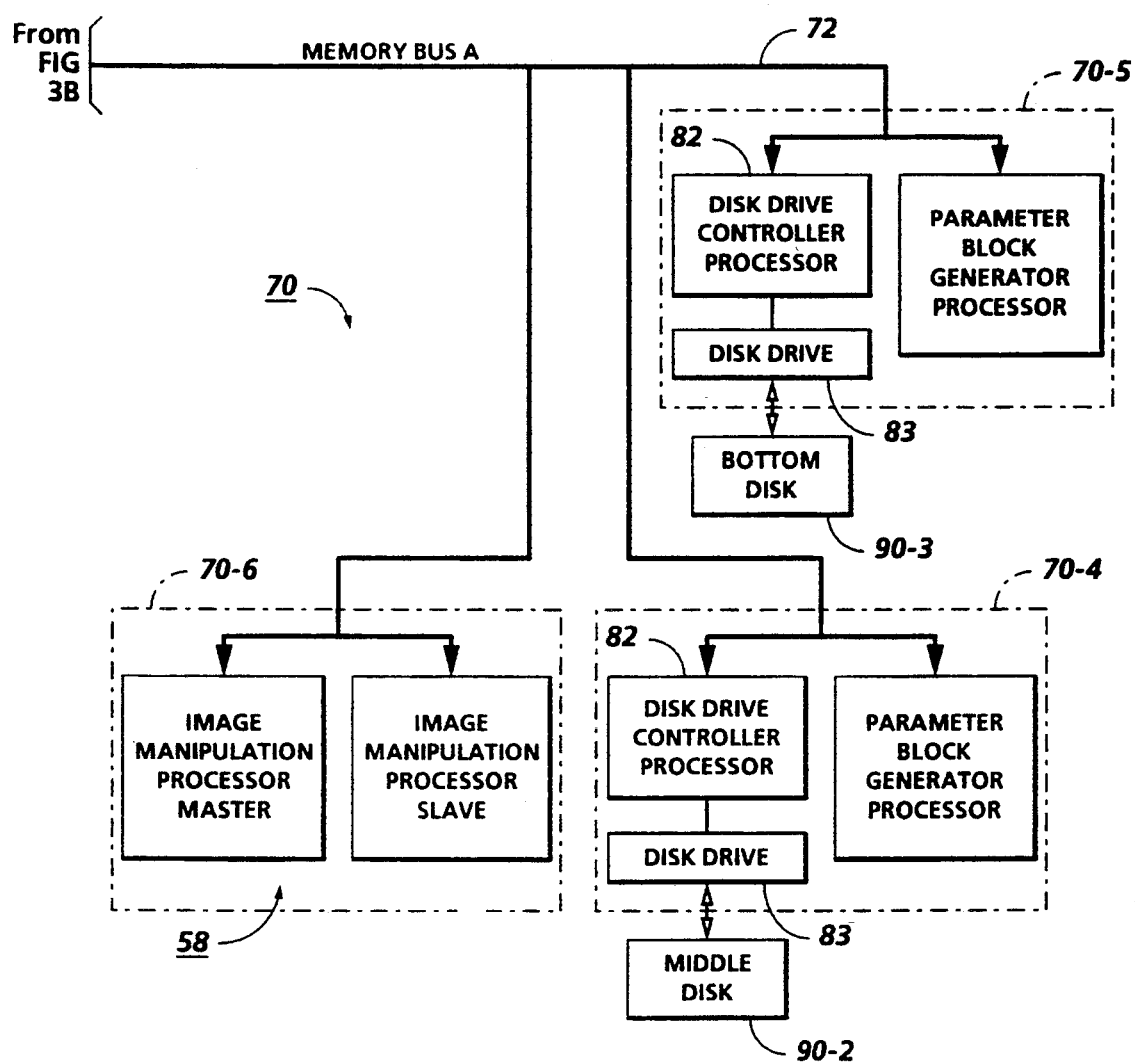
Figure 6:
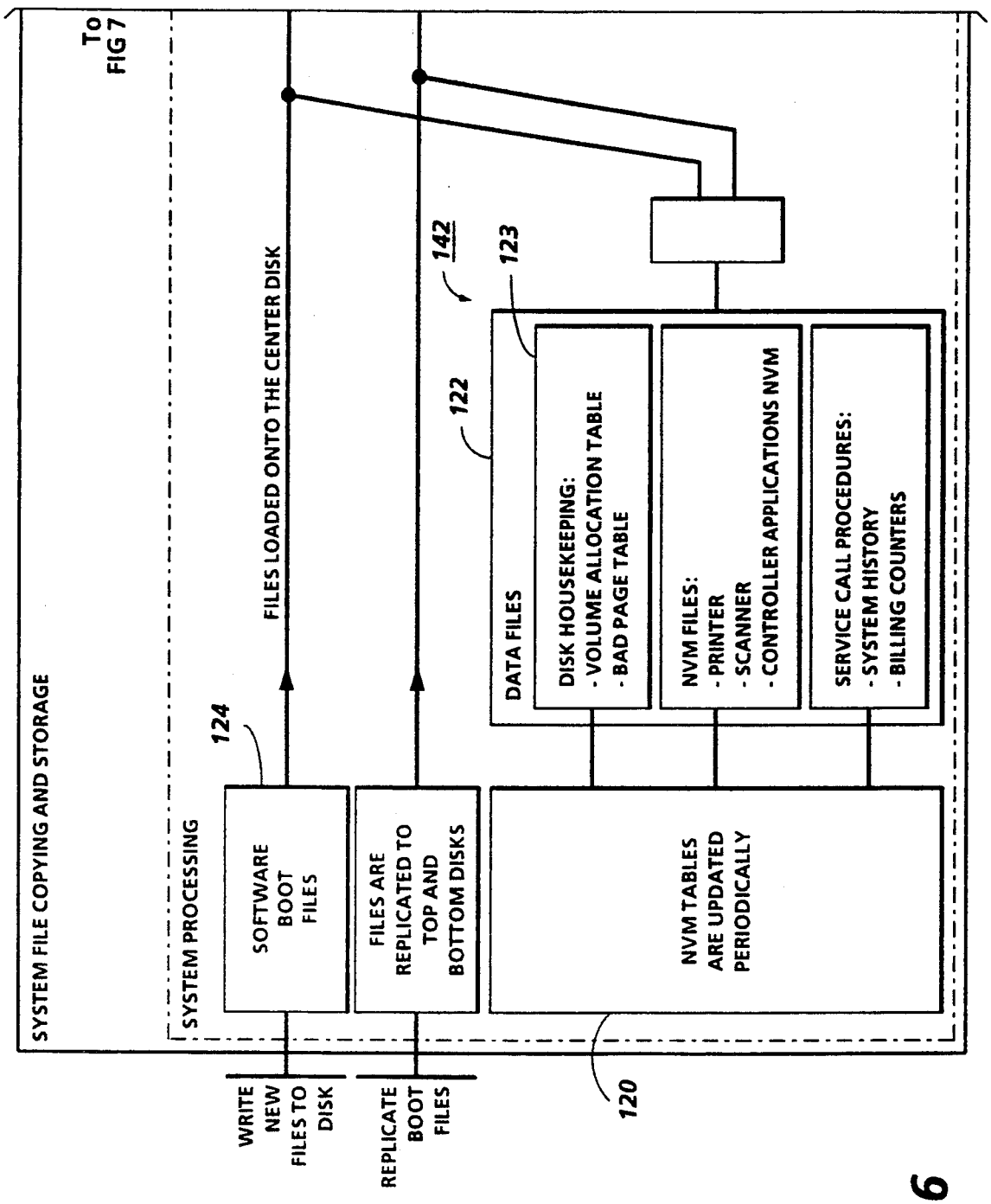
Figure 7:
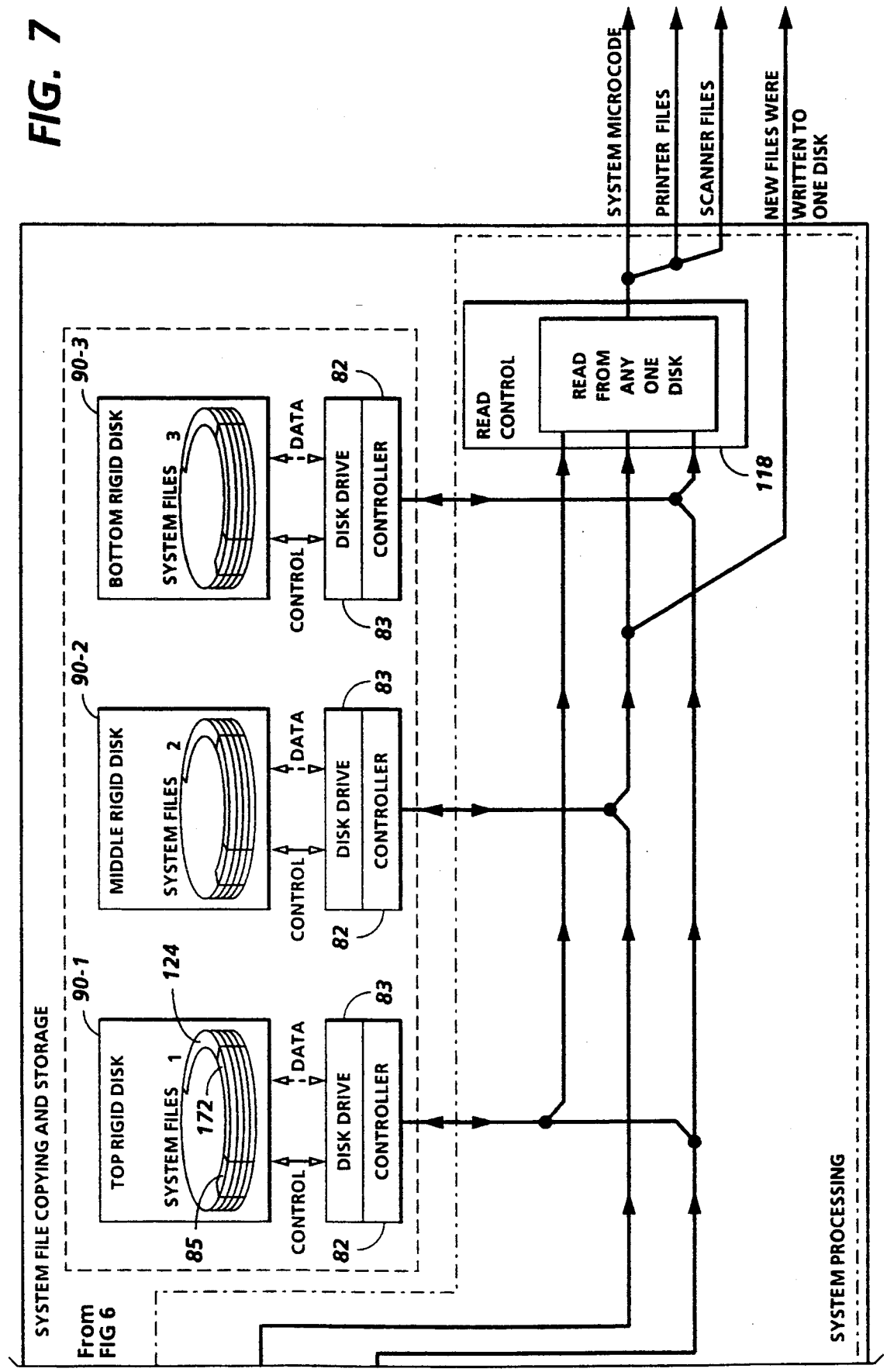
Figure 8:
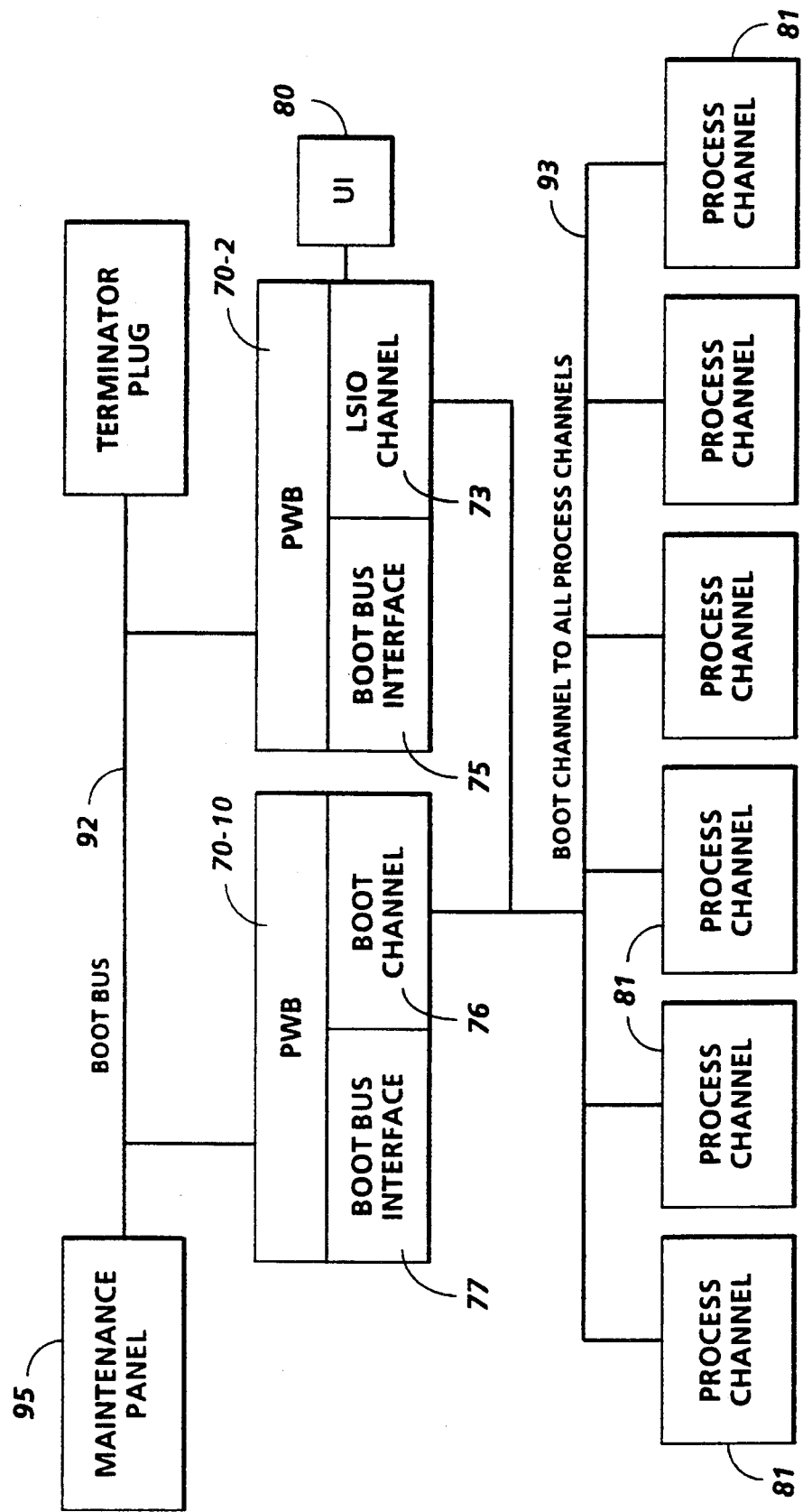
Figure 9:
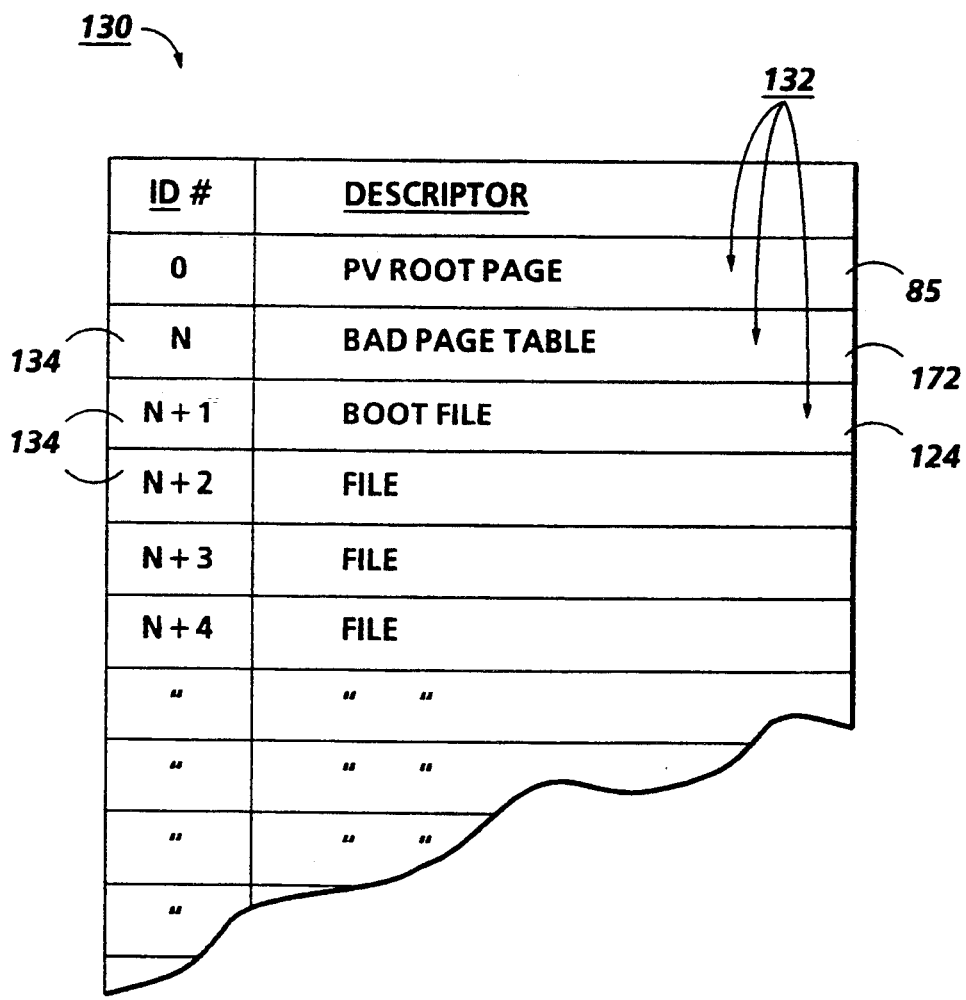
Figure 10:
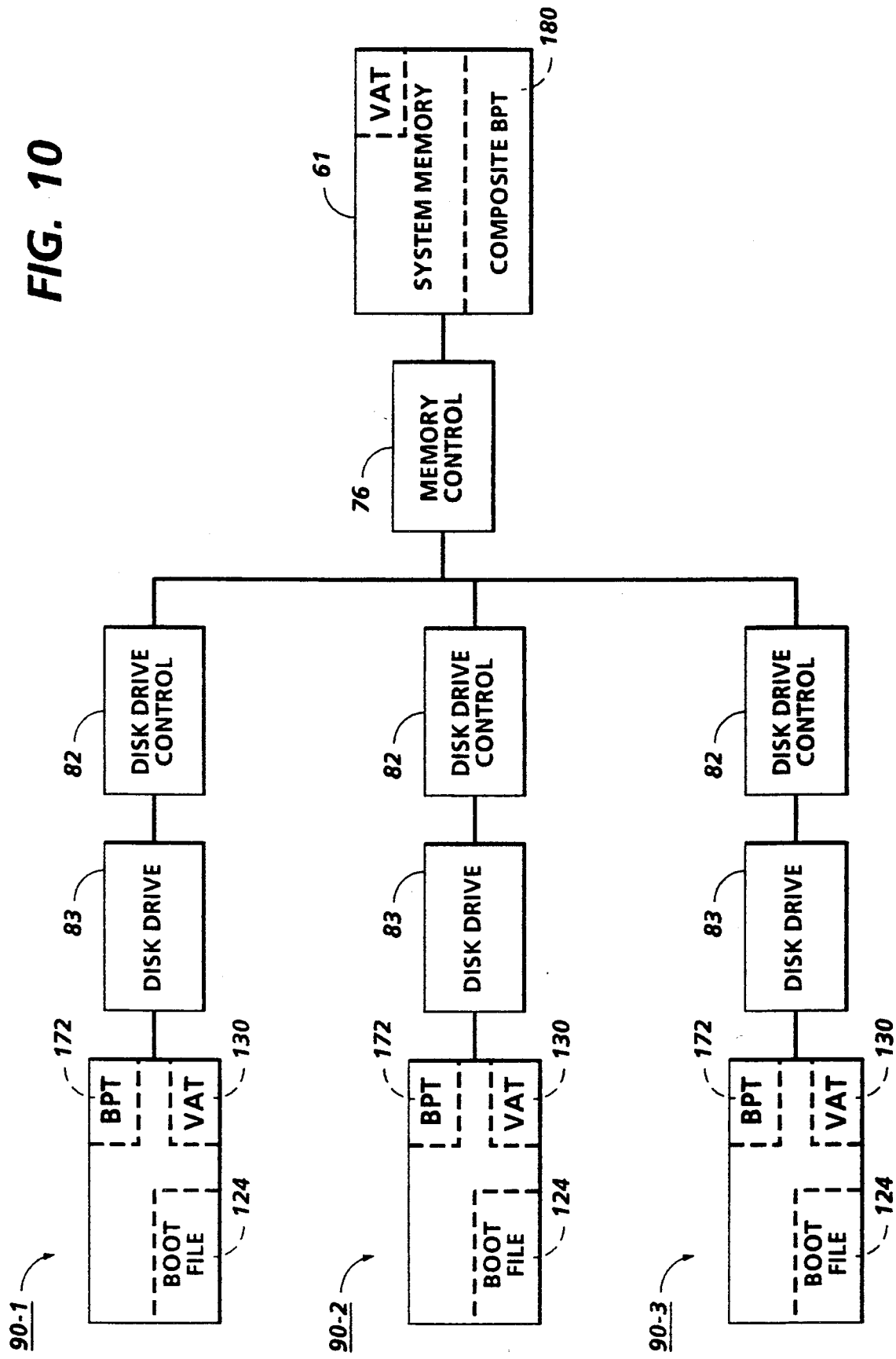
Figure 11:
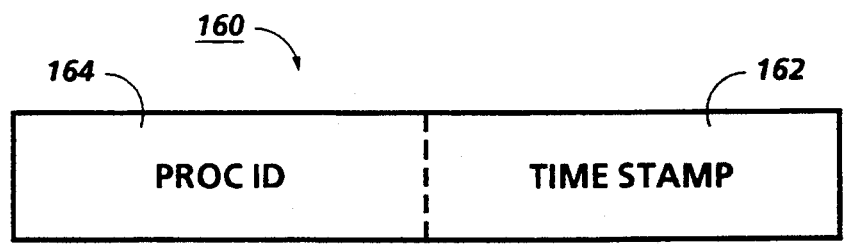
Figure 12:
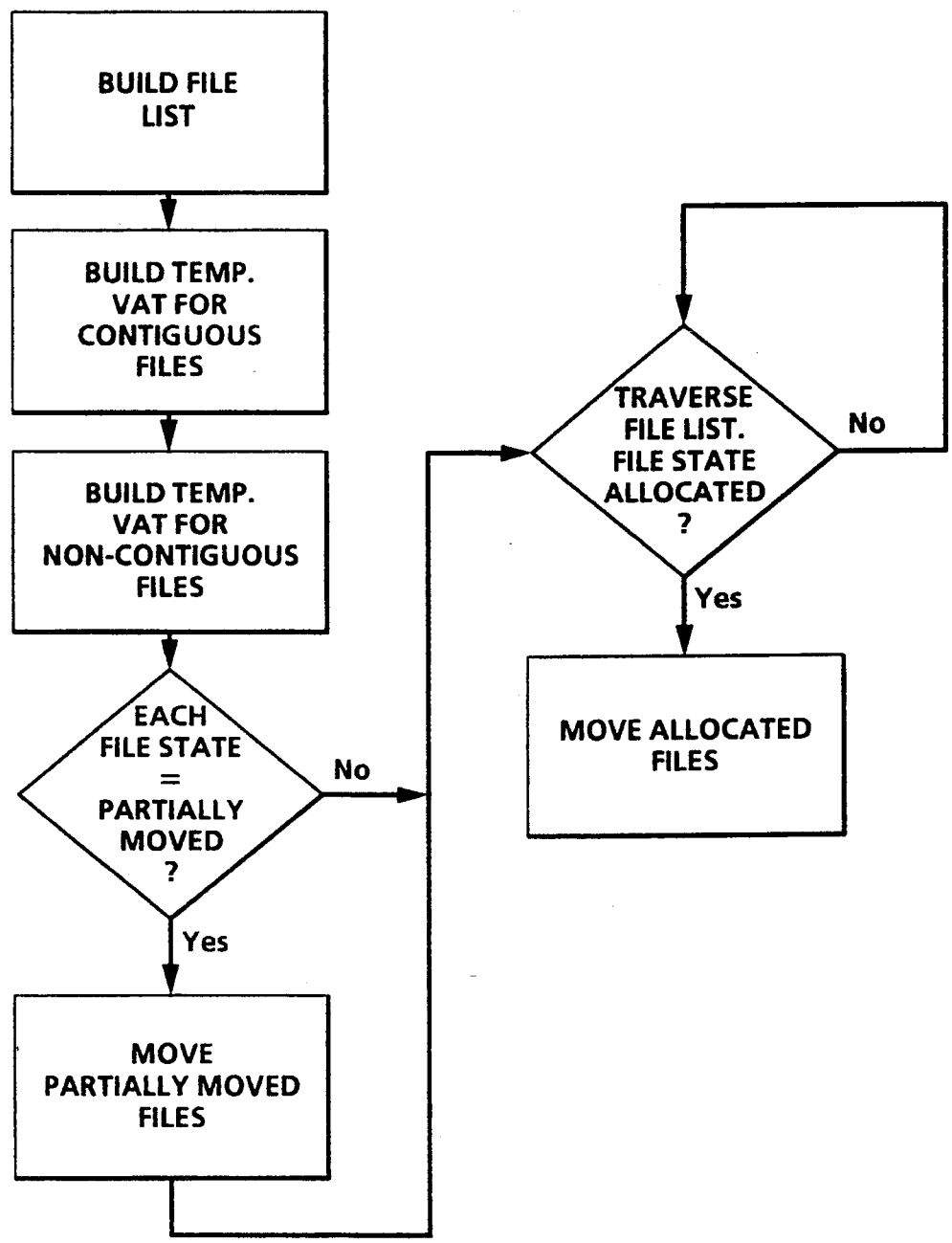
Figure 13:
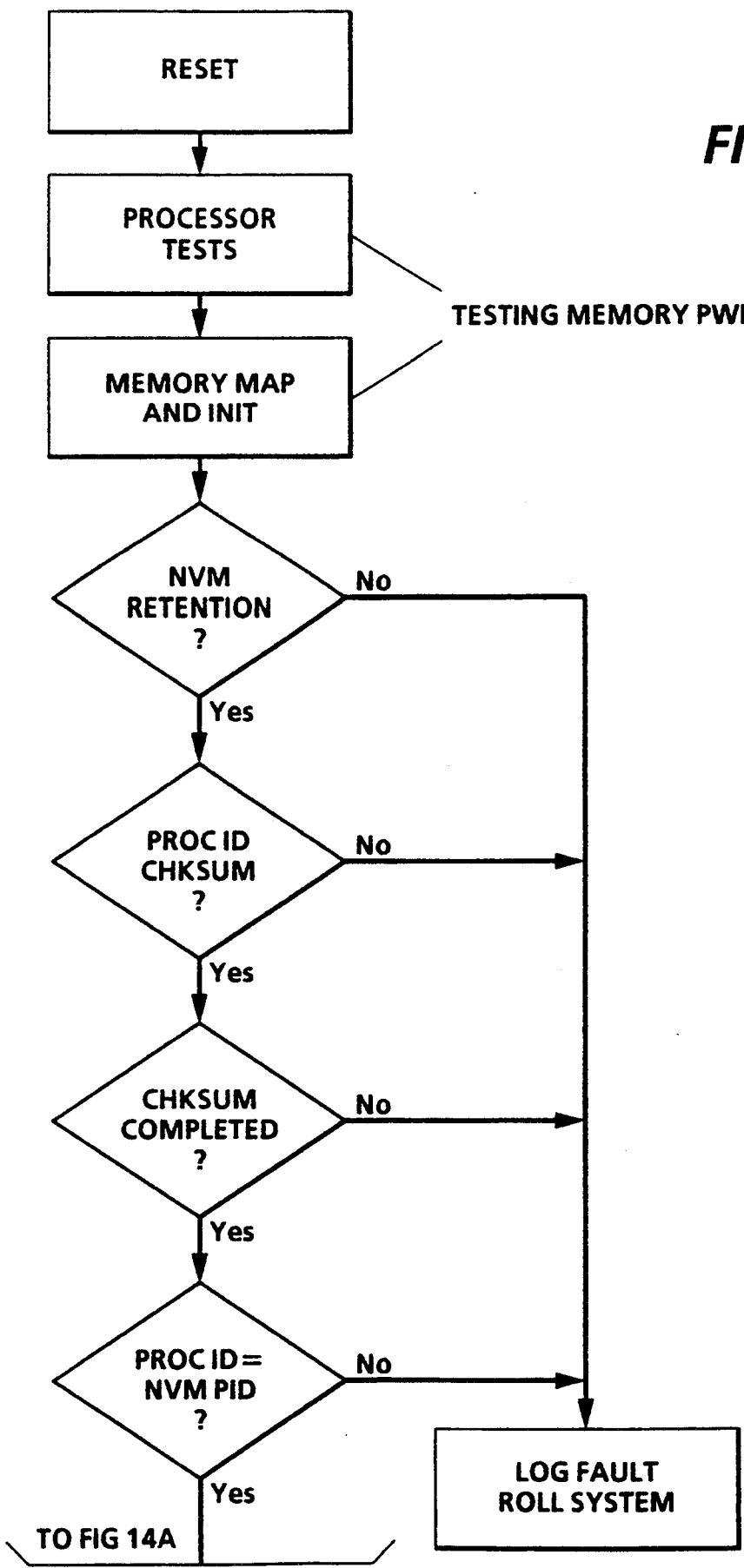
Figure 14A:
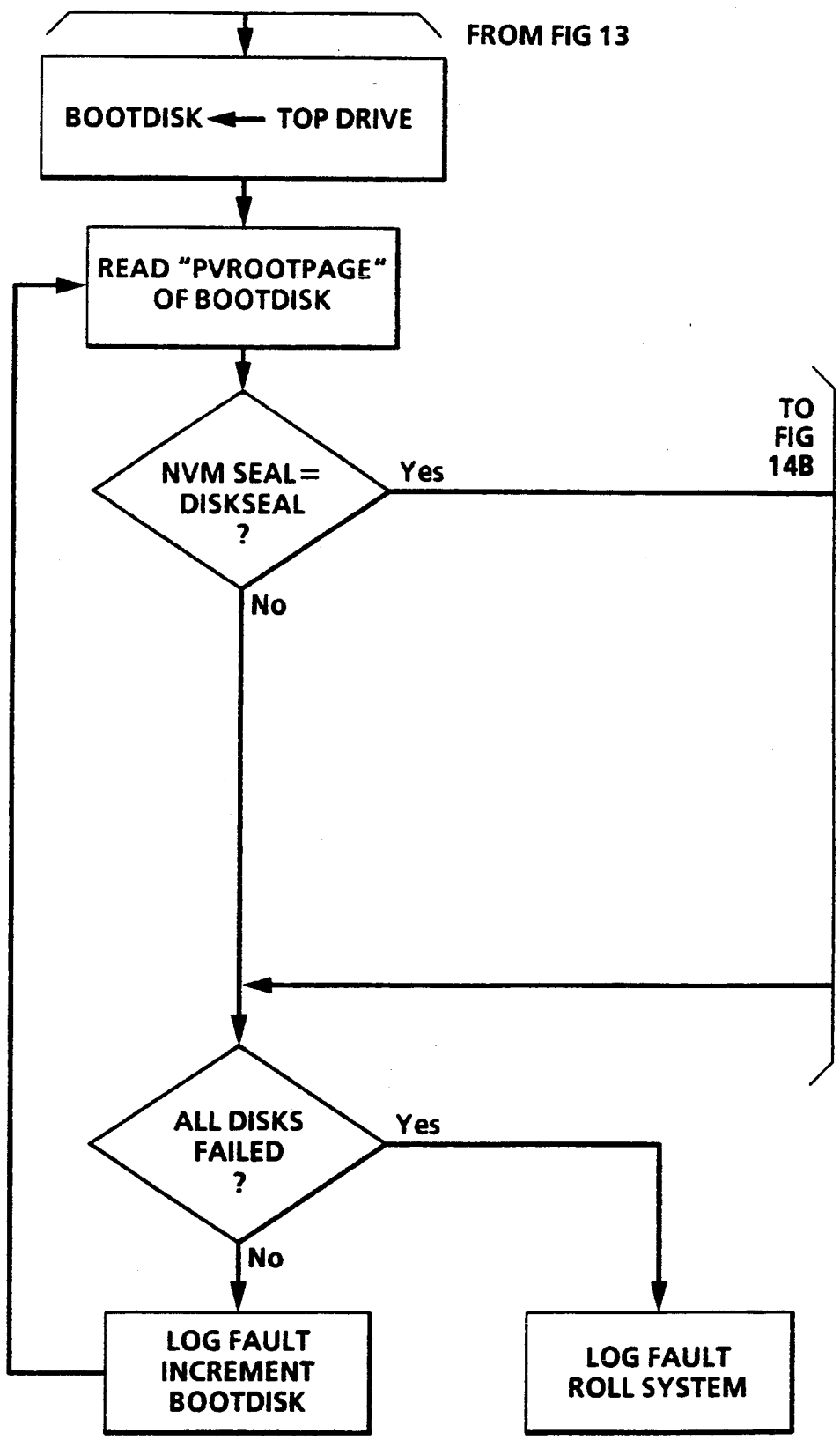
Figure 14B:
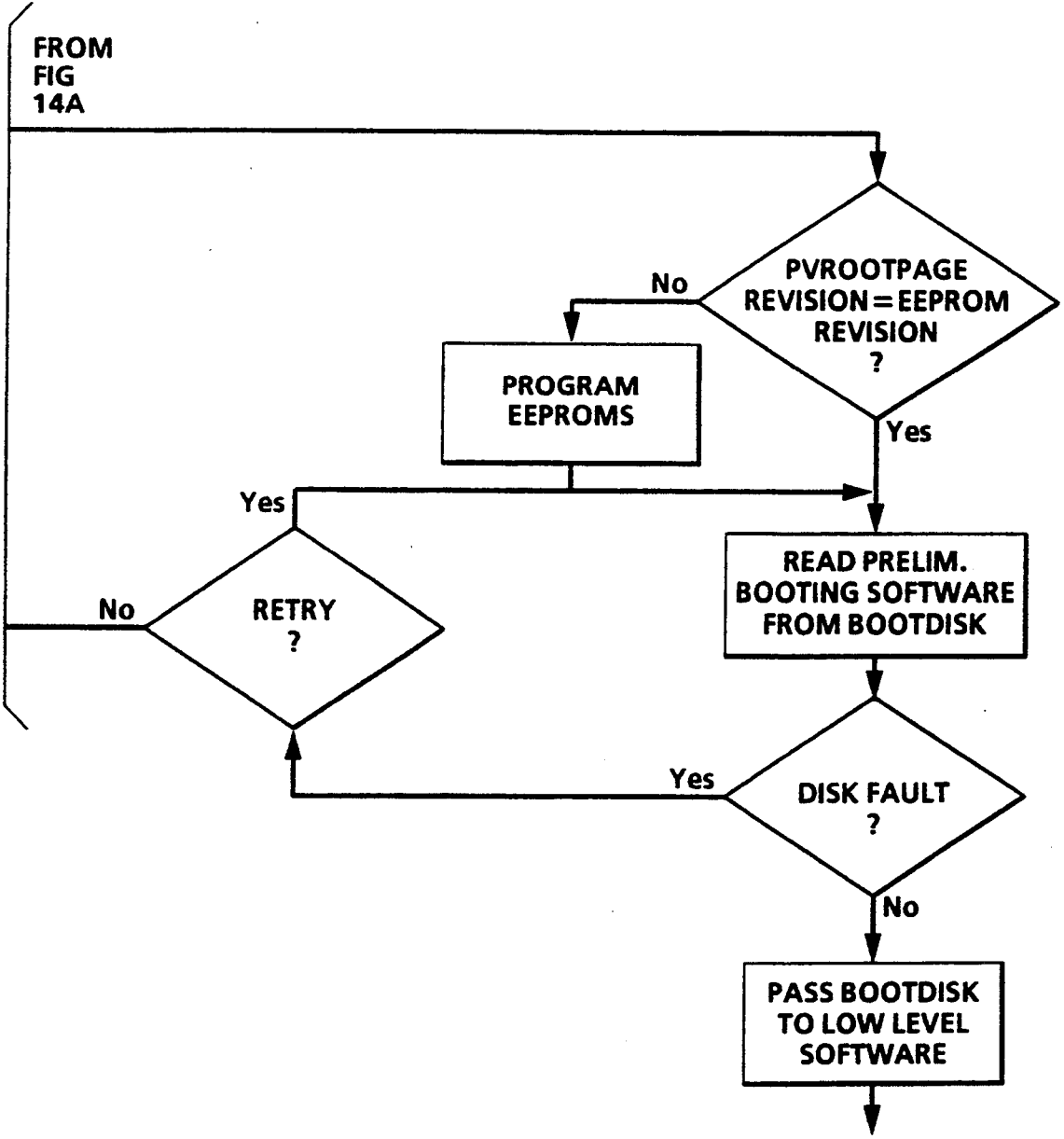
Figure 15:
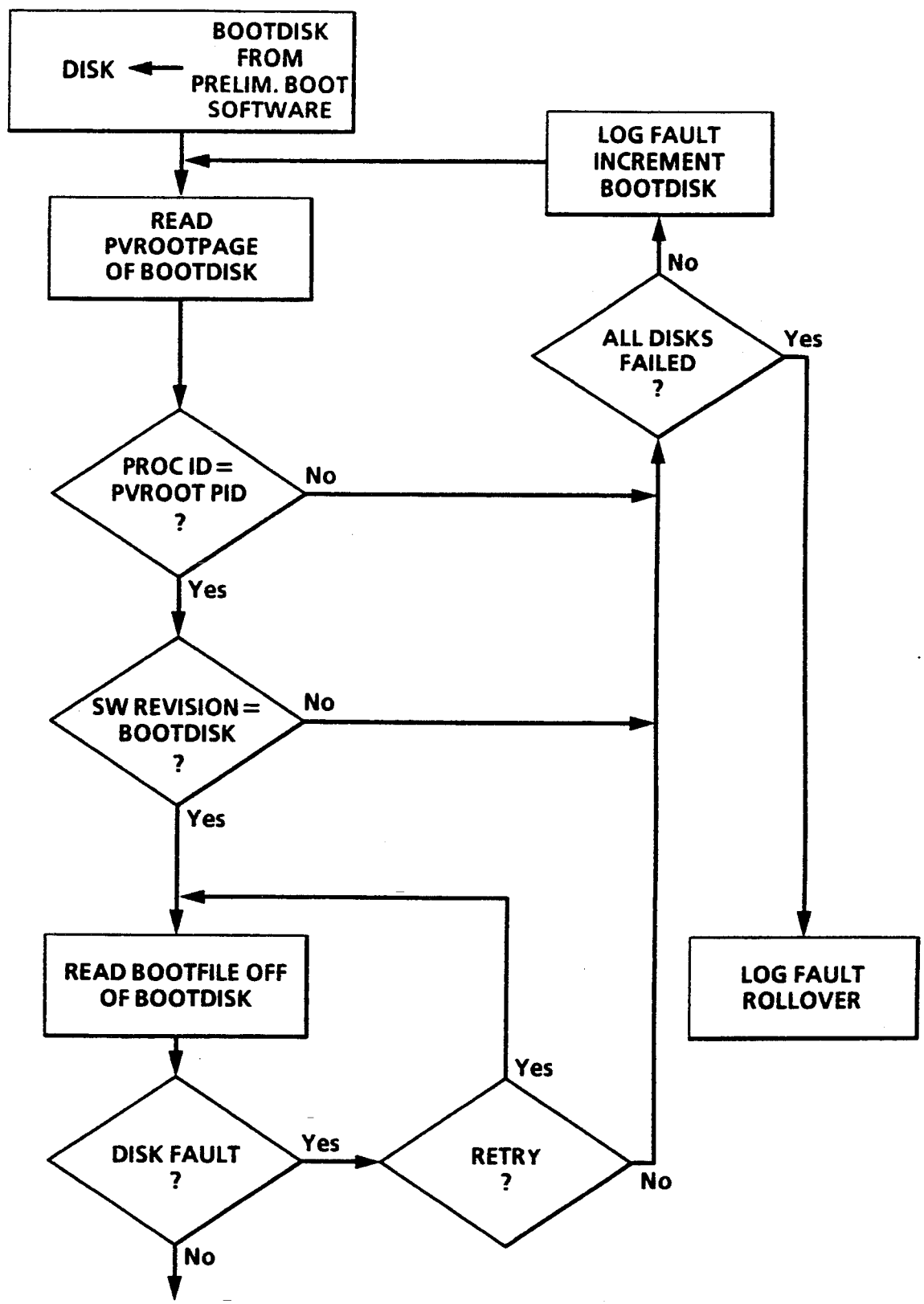
Figure 16:
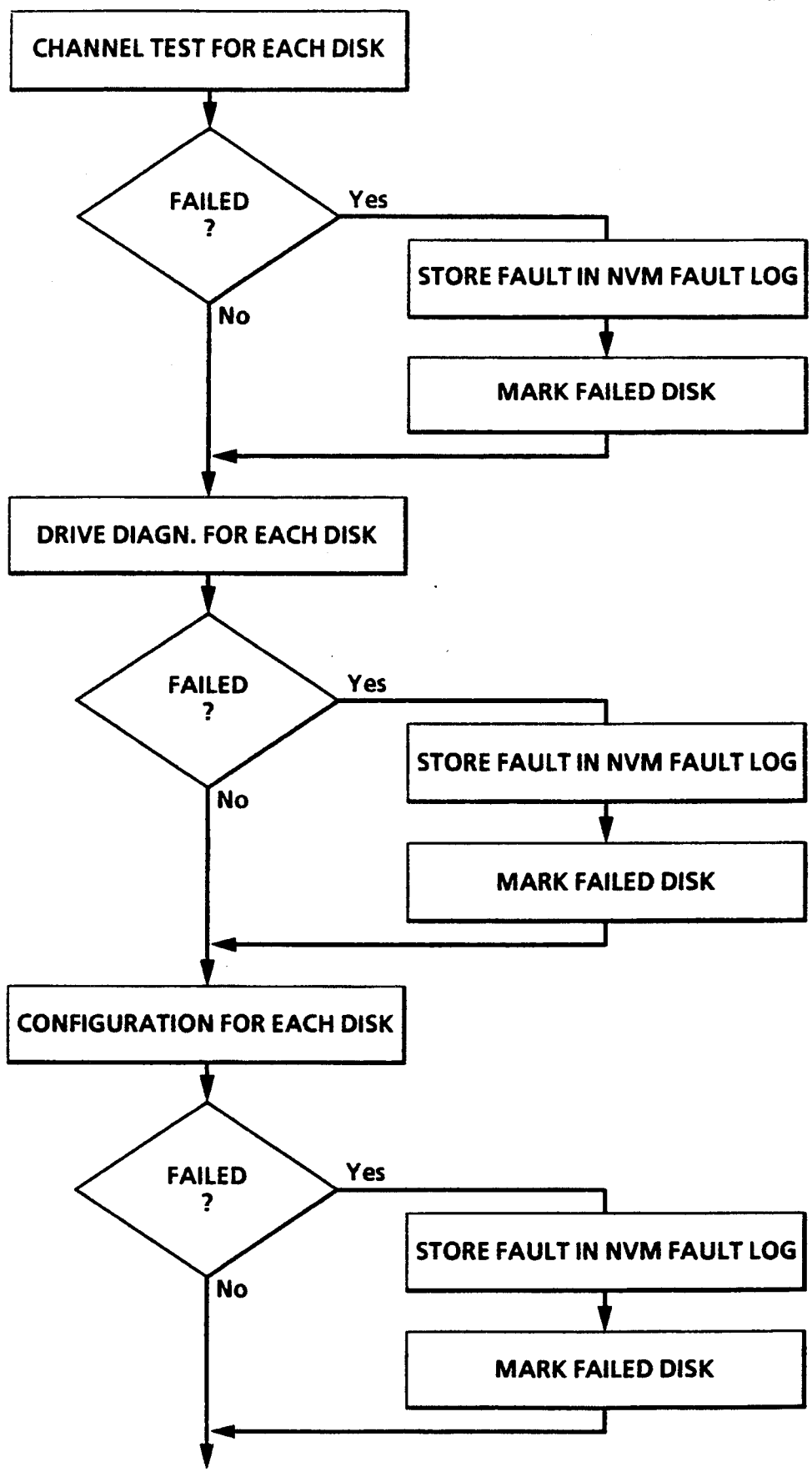
Figure 17:
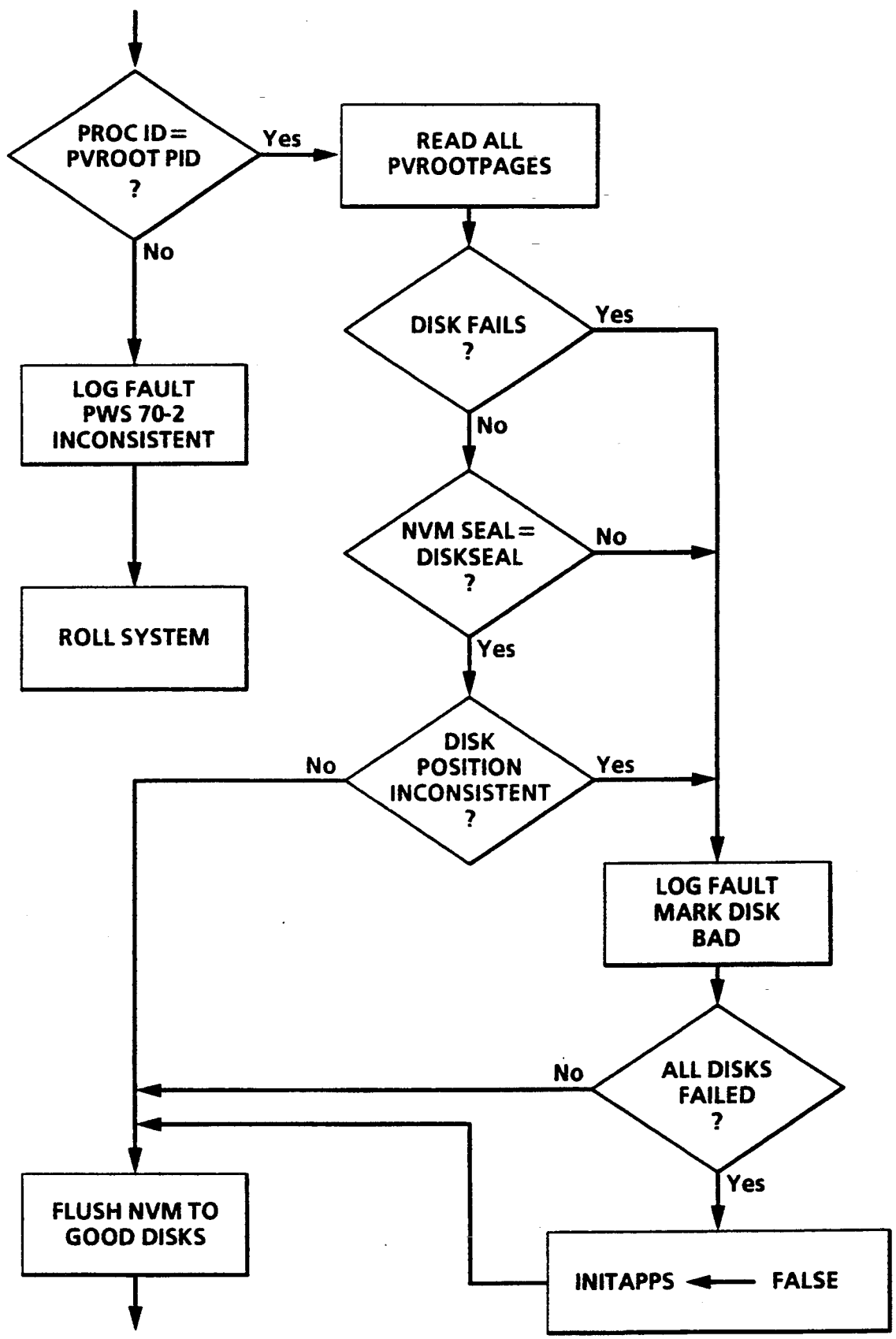
Figure 18:
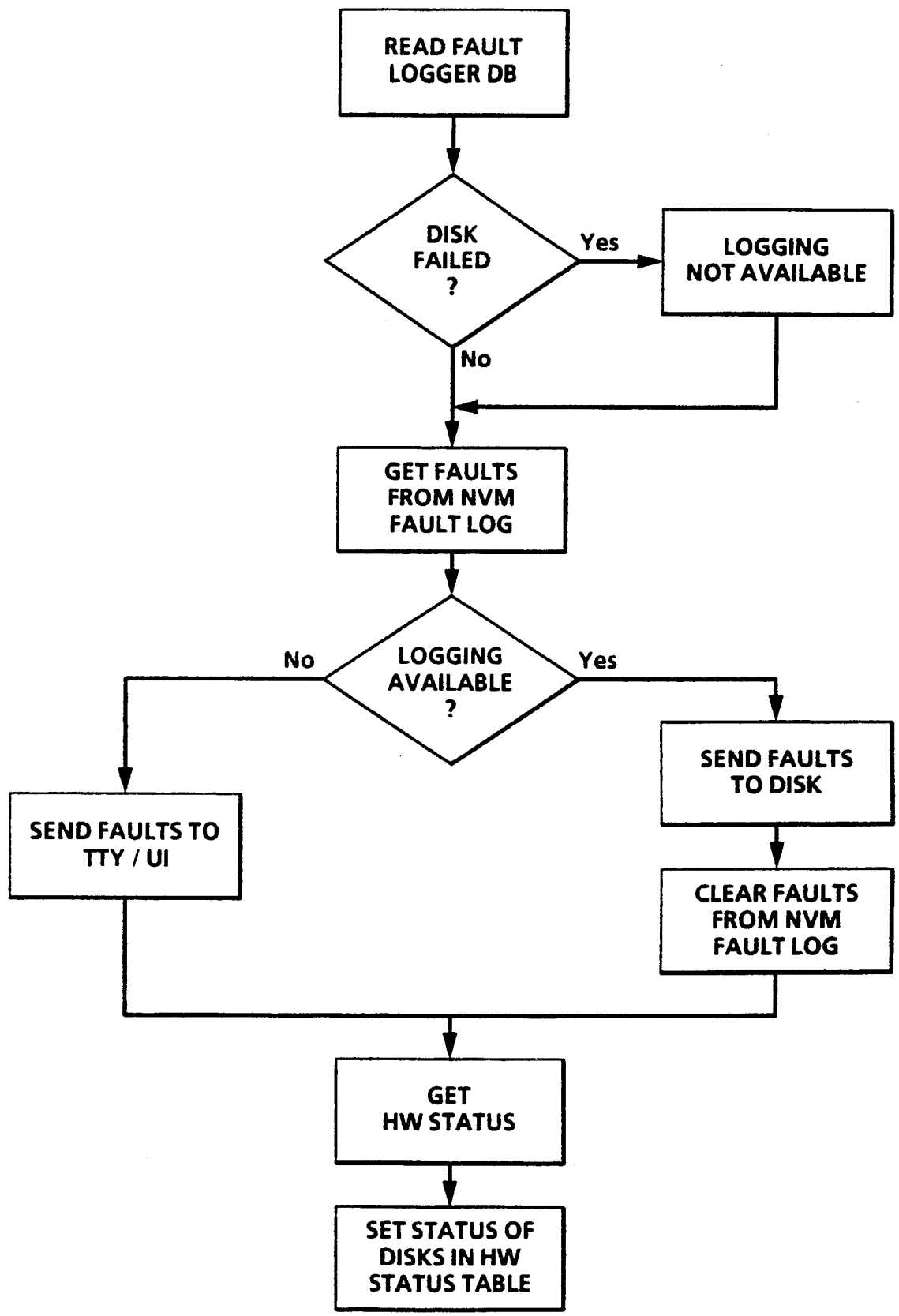
Figure 19:
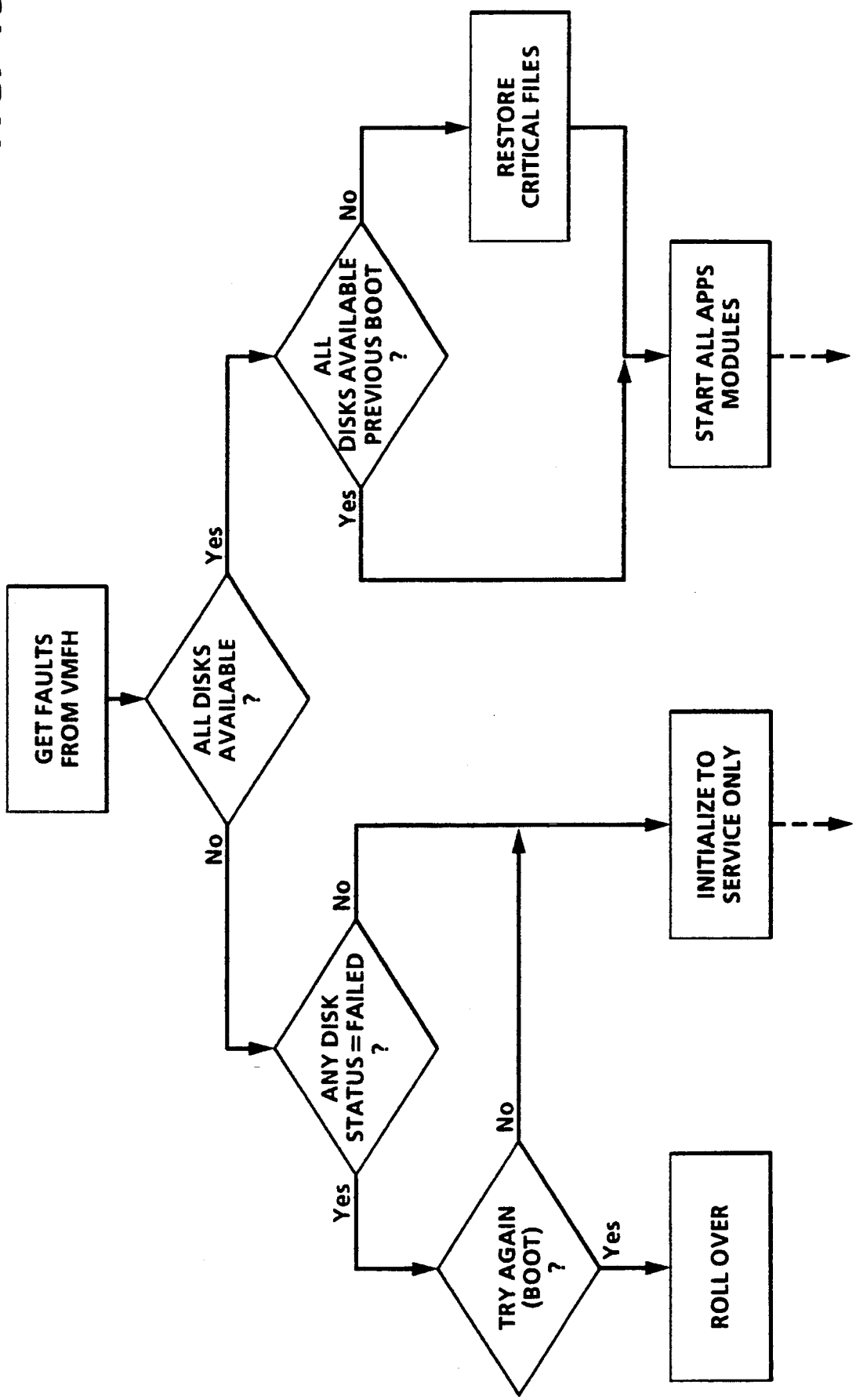
Figure 20:
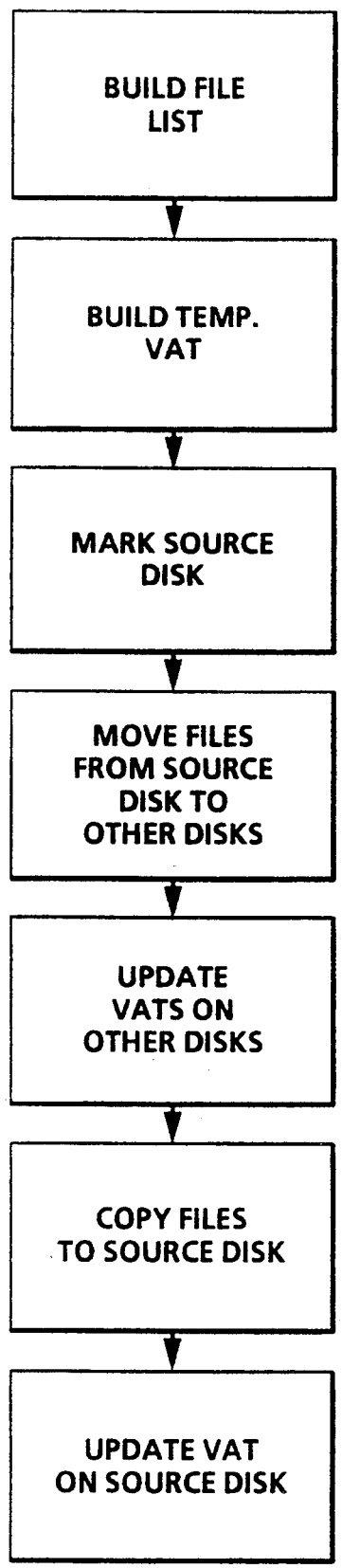

FIGS. 3A, 3B, and 3C comprise a schematic block diagram showing the major parts of the control section for the printing system shown in FIG. 1;

FIG. 4 is a schematic view depicting disk tracks of three disks that comprise the storage media of the printing system shown in FIG. 1 showing the manner in which image files and system files are stored on the disks with bad pages avoided;

FIG. 5 is a block diagram depicting the process for storing image files on disks to provide super disk files;

FIG. 6 is a block diagram depicting the process for collecting system files for storage on disks;

FIG. 7 is a block diagram depicting the process for replicating system files collected from FIG. 6 on disks;

FIG. 8 is a block diagram showing the boot system for booting the printing system depicted in FIG. 1 to an operating state;

FIG. 9 is a schematic view depicting an example of a Volume Allocation Table or VAT;

FIG. 10 is a block diagram showing the relationship between the disk storage media and system memory;

FIG. 11 is a view showing the PROC ID and TIME stamp elements that comprise the system processor identification seal for the printing system shown in FIG. 1;

FIG. 12 is is a flow chart showing the process for volume compaction of both super disk and replicated files;

FIG. 13 is a flow chart illustrating verification of Non-Volatile Memory (NVM) and Printed Wiring Board (PWB) seals during booting as related to the replacement of storage media;

FIGS. 14 and 14B are flow charts illustrating the process for identifying boot disk and loading preliminary booting software during booting as related to the replacement of storage media;

FIG. 15 is a flow chart illustrating the low level software booting process as related to the replacement of storage media;

FIG. 16 is a flow chart illustrating disk system initialization during booting as related to the replacement of storage media;

FIG. 17 is a flow chart illustrating file system initialization during booting as related to the replacement of storage media;

FIGS. 18 and 19 are flow charts illustrating application software initialization during booting as related to the replacement of storage media; and FIG. 20 is a flow chart showing the process for volume compaction of files following replacement of a disk.

DETAILED DESCRIPTION OF A PREFERRED EMBODIMENT OF THE DISCLOSURE

Figure 2:
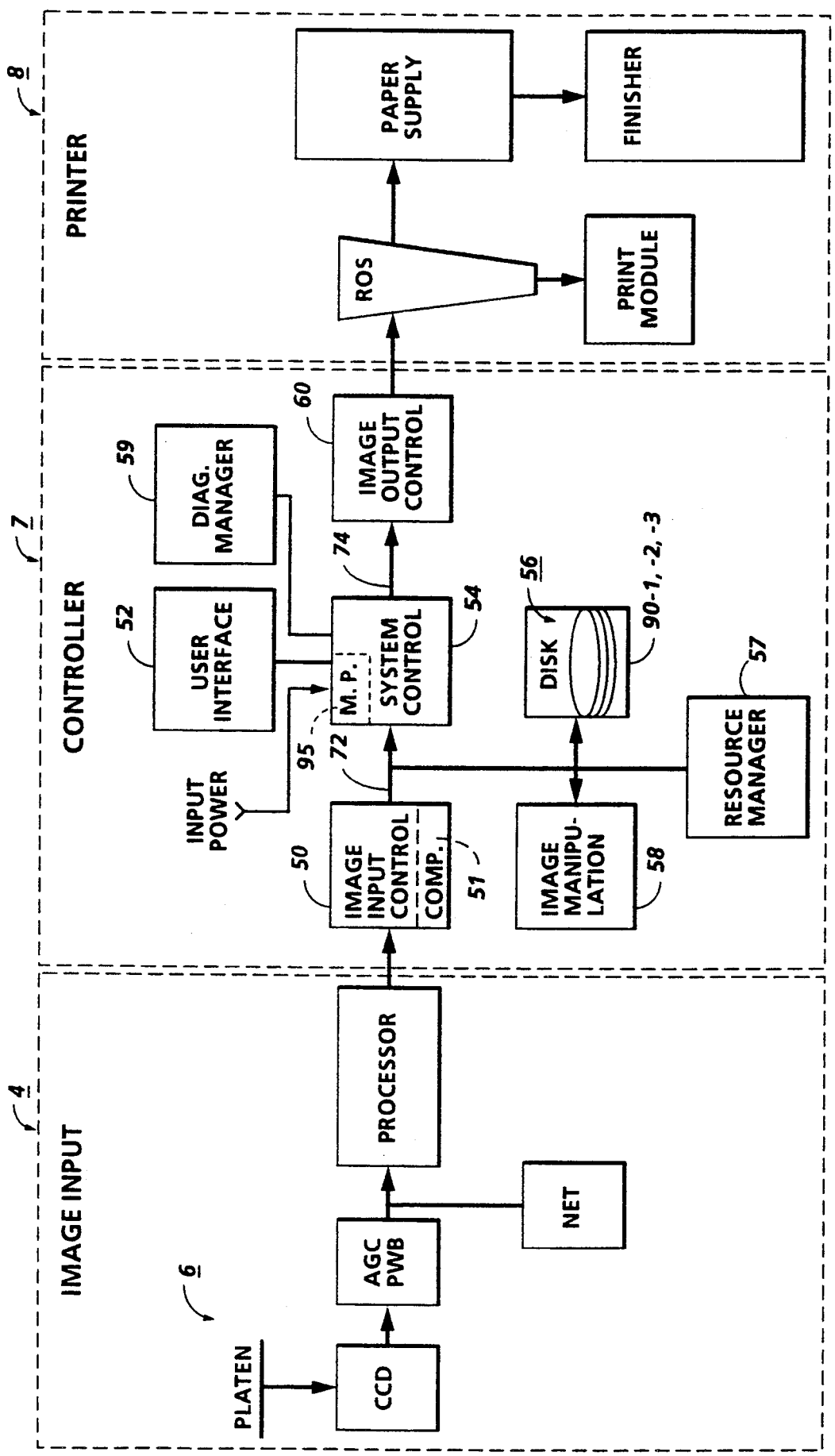
FIG. 2 is a block diagram depicting the major control system elements of the printing system shown in FIG. 1.

Referring to drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and furthermore may be incorporated in electronic display systems, such as CRTs, LCDs, LEDs, etc. or else other image scanning/processing/recording systems, or else other signal transmitting/receiving,recording systems, etc., as well.

A more detailed description of printing system 2 may be found in copending U.S. patent application No. 07/620,519, filed Nov. 30, 1990, to James R. Graves et al, and entitled "System for Scanning Signature Pages", the disclosure of which is incorporated by reference herein.

Referring to FIG. 2, controller section 7 is, for explanation purposes, divided into an image input controller 50, User Interface (UI) 52, system controller 54, disk memory 56, image manipulation section 58, Resource Manager 57, Diagnostic Manager 59, and image output controller 60.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, visual document facsimile display, programming information and icons, diagnostic information and pictorial views, etc. Items displayed on touchscreen 62 such as files and icons are actuated by either touching the displayed item on screen 62 with a finger or by using mouse 66 to point cursor 67 to the item selected and keying the mouse.

Referring to FIGS. 2 and 3A-3C, the scanned image data input from scanner section 6 to controller section 7 is compressed by image compressor/processor 51 of image input controller 50 on PWB 70-3. The compressed image data with related image descriptors are placed in image files and temporarily stored in system memory (RAM) 61 pending transfer to external memory 56 where the data is held pending use.

When the compressed image data in memory 56 requires further processing, or is required for display on touchscreen 62 of UI 52, or is required by printer section 8, the data is accessed in memory 56 and transferred to system memory 61. Where further processing other than that provided by processor 25 is required, the data is transferred to image manipulation section 58 on PWB 70-6 where additional processing steps such as collation, make ready (document editing), decomposition, rotation, etc., are carried out. Following processing, the data may be returned to external memory 56, sent to UI 52 for display on touchscreen 62, or sent to image output controller 60.

Resource Manager 57 controls access to disks 90-1,90-2, 90-3 and RAM 61 files while diagnostic manager 59 handles system faults.

Image data output to image output controller 60 is decompressed and readied for printing and output to printer section 8. Image data sent to printer section 8 for printing is normally purged from memory 56 to make room for new image data.

As shown in FIGS. 3A-3C, controller section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural application or system processors 78; low speed I/O processor PWB 70-2 having UI communication controller 80 for transmitting data to and from UI 52, Boot Control & LSIO Services Processor 73, and Boot Bus Processor 75; PWBs 70-3, 70-4, 70-5 having disk drive controller/processors 82 with disk drives 83 for transmitting data to and from disks 90-1, 90-2, 90-3 respectively of external memory 56 (image compressor/processor 51 for compressing the image data and another application processor 78 are on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10 having Channel Loader/Scheduler Processor 76, Boot Bus Processor 77, Boot Download Control Logic 79, and Memory Bus Arbitration Logic/Resource Manager 57. As will appear, Loader/Scheduler Processor 76 has two functions, one as a Boot channel to bring the system to the ready state and the other as a scheduler channel used to decide which channel performs which task and in which sequence the tasks will be performed.

Each independent processor and associated circuitry form a channel 81. Channels 81 (an example is shown in FIG. 3B) are independent processors for handling the applications software, or input/output processors for handling peripheral devices such as disk drives. For example, there are disk channels used to interface disk drives 83 for disks 90-1, 90-2, 90-3, scanner interface channel, printer interface channel, etc.

Memory 56 has plural hard disks 90-1,90-2, 90-3 on which image files 140 (FIG. 5) and system files 142 (FIG. 6) are stored. Image files are typically files of scanned image data, while system files comprise system operating files such as boot files, software files, data files, etc.

System memory 61, which comprises a Random Access Memory or RAM, serves as a temporary store for data required during system operations. Memory 61 stores bits of data which can be written to (Data Entered) or read from (Data Used) from the memory. Other data in memory 61 is used for reference and remains loaded as long as power is supplied. Since memory 61 is volatile, that is, all data is lost when power to memory 61 is terminated, Non-Volatile Memory or NVM, which essentially comprise RAM memory with battery backup to supply DC voltage when power is turned off, are provided at several locations in the system as, for example, NVM 63 on Low Speed I/O Processor PWB 70-2 (FIG. 3B). NVM 63 is used to store file management updates and file content updates.

Copending U.S. patent application No. 07/590,634, filed Sep. 28, 1990, to George L. Eldridge, and entitled "Method of Operating Disk Drives in Parallel", the disclosure of which is incorporated by reference herein, describes what will be referred to herein as Super Disk. Super Disk allows faster read/write access to files since all disks 90-1, 90-2, 90-3 can be accessed simultaneously. The risk incurred in this type of arrangement, however, is the loss of parts of a file should one or more of the disks fail which effectively results in loss of the entire file.

Referring to FIGS. 4 and 5, to implement Super Disk, image files 140 to be transferred to disks 90-1, 90-2, 90-3 are divided by divider logic 110 into sectors 150, each sector 150 being a preset number of bytes. The sectors are written in succession to successive disks until all of the sectors that comprise the image file are stored. For example, sector 1 of image file 140 is written to disk 90-1, sector 2 to disk 90-2, sector 3 to disk 90-3, sector 4 to disk 90-1, sector 5 to disk 90-2, and so forth and so on. As a result, one larger storage media or super disk is effectively formed. An image location logic 112 designates the location for each sector on disks 90-1, 90-2, 90-3, with the address of each corresponding block of sectors (i.e., sectors 1, 2, 3; sectors 4, 5, 6, etc.) being the same. Image data sequence logic 114 controls the disk writing sequence while write/read control logic 116 provides the actual instructions to write or read image data to or from disks 90-1, 90-2, 90-3. Image data read from disks 90-1, 90-2, 90-3 is reconstructed by read control logic 118 which reads the image file sectors back from disks 90-1,90-2, 90-3 in the same manner as the data was written to disks 90-1,90-2, 90-3.

Referring to FIGS. 4, 6 and 7, system files 142 are normally permanent files which must be maintained. To assure retention, system files 142 are replicated on each of the disks 90-1, 90-2, 90-3 at the same address. Replicated files are written simultaneously to all three disks 90-1, 90-2, 90-3, with the disk heads in the same position.

System files 142, whether updates 120 of data files 122 that occur periodically during operation and life of the system 2 or new files such as new or upgraded software entered as software boot files 124, are written to one disk, as for example center disk 90-2, through Disk Drive Control Processor 83 for disk 90-2. The system files are thereafter migrated to the other disks, in this case, top and bottom disks 90-1, 90-3. Read control 118 reads system files 142 from any one of the disks 90-1,90-2, 90-3.

As a result, both super disk files (i.e., image files 140 that are distributed equally on each disk 90-1, 90-2, 90-3 of the system) and replicated files (i.e., duplicate system files 142 on each disk 90-1,90-2, 90-3) are created. When super disk files are accessed, all disks 90-1, 90-2, 90-3 are busy retrieving/storing data from/to disks. When a copy of a replicated file is accessed for reading, only one disk is busy. Since reading a file from a single disk takes longer than accessing a super disk file, Channel Loader/Scheduler Processor 76 schedules single disk access to all disks 90-1, 90-2, 90-3 in parallel, allowing the system to retrieve more than one file at a time.

Referring to FIGS. 3A, 3B, 7 and 8 and TABLE I, a boot file 143 is replicated on each of the disks 90-1, 90-2, 90-3 for booting system 2. In order to disk boot system 2, the boot software loads the necessary files from whichever disk 90-1, 90-2, or 90-3 is selected as the boot disk into memory and enables execution of the software. Since the boot file is replicated on all disks 90-1, 90-2, 90-3, any disk can be selected as the boot disk. In the ensuing explanation, disk 90-2 is selected as the boot disk.

As will be understood, it is necessary to boot the system when power is first switched on (Cold Boot initiated) or when necessary during system operation (Warm Boot initiated). For example, a manual 'Boot' button (not shown) is provided for initiating a Warm Boot.

In a Cold Boot, the system processors 78, except for a maintenance panel 95, are in a reset state. On power up, maintenance panel 95 checks to determine if power input is correct, and if so, releases reset lines contained in a Boot Bus 92. Boot Bus 92 is coupled to Boot & LSIO service processor 73 and UI communication controller 80 on PWB 70-2 through boot bus processor 75, and to channel loader/scheduler processor 76 on PWB 70-10 through boot bus processor 77. The reset lines release processors 76 and 73 and UI communication controller 80, allowing Boot Bus 92 during the boot sequence to transmit software programs from PWB 70-2 to processor 76 on PWB 70-10 for downloading to each processor channel 81. Once communications are established, Boot Channel 93 initializes all channels 81 to enable downloading of the micro code instructions by channel loader/scheduler processor 76 as described in TABLE I.

Referring to FIGS. 9 and 10, to keep track of space or volume on disks 90-1, 90-2, 90-3, a file system is used to maintain a record of space allocated to each image and system file 140, 142 on disks 90-1, 90-2, 90-3. For this, the file system maintains a Volume Allocation Table (herein referred to as VAT) 130 for each logical disk volume. VAT 130 keeps a record of available disk space and a list of the file descriptors 132 for every file 140, 142 on that volume. Each file 140, 142 has a unique ID consisting of an index 134 which is offset into VAT 130 and file descriptor 132. File descriptors 132 contain information concerning the physical location of the file on the disk and the physical characteristics of the file. Descriptors 132 may be linked together when a file spans multiple runs of a disk. There is a common VAT 130 for all three disks 90-1, 90-2, 90-3. A copy of the VAT 130 is stored on each disk.

Referring to FIGS. 4, 7 and 10, disks such as disks 90-1, 90-2, 90-3 normally have flawed or bad pages 170 that are defective and hence cannot be used. A bad page table 172 having a list of bad pages 170 for each particular disk is stored on the disk at a known location.

As described previously, a common VAT 130 is maintained for disks 90-1,90-2, 90-3, with replicated system files 142 having a common file address and each block of three sectors 150 similarly having the same file address.

Since the number and location of bad pages 170 will vary from disk to disk, the file system marks the same page 170' as inaccessible on each disk. In the example shown in FIG. 4, a bad page 170 appears on disk 90-2. The corresponding pages 170' on each of the other disks 90-1,90-3 are also marked bad and therefore are inaccessible. When a system file 142 is allocated, the file system creates a run 174 around the marked areas 170, 170', the run 174 describing the contiguous extents that comprise the marked area of the file. Each run 174 consists of a start address of the run with respect to the disk and the length of the run.

In the case of an image file 140, sectors 150 are located so that a bad page 170 on one disk (and the corresponding bad pages 170' on the other disks) are avoided. This avoids the need to break up individual sectors 150.

Referring to FIG. 11, processor identification seals 160, which comprise for example a 12 byte quantity having a 6 byte time stamp 162 (read from the system real time clock 84—seen in FIG. 3B) and a 6 byte processor identification (PROC ID) 164, are provided. The PROC ID 164 is kept on a chip such as PROM 69 socketed onto PWB 70-2 (seen in FIG. 3B). In the event PWB 70-2 is replaced, PROM 69 is removed from the defective PWB and socketed onto the new PWB to maintain the PROC ID 164 intact. A copy of the processor ID and initialized time stamp (SysNVM Seal) is stored in system NVM 63 on PWB 70-2 (seen in FIG. 3B). On each disk 90-1, 90-2, 90-3, the disk Physical Volume Root Page 85 (PV Root Page), which includes a PV Root Page seal comprising the PROC ID seal plus the position of the disk in the super disk setup, is stored at page zero on each disk.

With the identification seals described above, when one of the disks 90-1, 90-2, 90-3 or PWB 70-2 has been replaced, the disk change can be detected. Similarly, switching or swapping of the disks with one another can be detected.

Referring also to FIG. 12, to recover contiguous disk space and remove disk space fragmentation on disks 90-1, 90-2, 90-3, compaction is employed to move files to one end of the disk volume, leaving large contiguous free space at the other end of the volume. Disk housekeeping software 123 (FIG. 6) detects the need for compaction and notifies the operator who initiates the compaction process. However, there exists a danger of loss of files if during compaction the system crashes.

To obviate this, the system maintains state information which enables, on reboot following a crash, compaction to be restarted at the point where compaction was interrupted. Since the system has both super disk and replicated files, volume compaction for volume having both super disk and replicated files is different than compaction for volume having replicated files only, the latter normally occurring on disk replacement.

For both super disk and replicated files, volume compaction is effected by building a list of files on volume sorted in ascending order by disk addresses. Following this, an empty Volume Allocation Table (VAT) is temporarily built, and the PV Root page 85, Bad Page Table 172, and boot file 124 are marked. New locations are found and allocated for all contiguous (i.e., 1 run) files. Following this, new locations are found and allocated for all files with multiple runs, that is, non-contiguous files. Following allocation, the files are moved to the disk locations allocated for each file.

Moving of the files may, in the case where another file or partial file occupies an allocated area, require file swapping. That is, the file currently occupying the allocated space must be moved to another location to make room for the file newly allocated to that disk space. Swapping is further complicated where the files being swapped are not the same size. This may result, during the compaction process, in files being partially moved. To facilitate swapping, plural swap files (for example, two) are provided to temporarily hold the files being swapped during the file swapping process. This protects against loss of a file should the system crash during the swapping process.

When all the files marked allocated as described by the temporary VAT have been moved, the disk VATs 130 are updated with the new file locations and the temporary VAT erased.

Referring to FIGS. 13-20, whenever the system is booted, the PROC ID 164 stored in PROM 69 is read and compared with the PROC ID from the SysNVM Seal to determine if PWB 70-2 is defective or replaced. The PROC ID is also compared with the PVRoot Page PROC ID to see if the boot disk has been replaced. The SysNVM Seal is compared with the PVRoot Page Seals on the other disks to see if any of the other disks have been replaced. A difference in the position of the PVRootPage Disk indicates that two disks have been swapped, and are therefore not in correct position in the disk memory.

When the boot file 143 cannot be read off the selected boot disk, i.e. disk 90-2, the disk number is incremented and the booting process continues using a second disk. If the second disk is found to be unavailable, booting from the third disk is tried. Where booting cannot be made from any disk following a preset number of tries, the system returns to a service dialogue routine in Diagnostic Manager 59 (seen in FIG. 2), requiring servicing by the Tech Rep and booting of the system from an outside source such as streaming tape.

Where the foregoing comparison detects that a disk has been replaced or that two disks have been swapped, the system boots up to the service dialog after N attempts. The Tech Rep runs a utility that regenerates the VAT 130. Whenever one or more disks 90-1, 90-2, 90-3 are replaced, super disk files, which are scattered among the disks, are lost, leaving only replicated files. Preferably, file compaction is run by the Tech Rep at this time to move the system files which remain to one end of the disk volume.

For this, a list of files on volume is built together with a temporary VAT allocating space for contiguous files and then noncontiguous files as described above. A disk is marked as a source disk and the allocated files moved from the source disk to the remaining disks to the new locations defined by the temporary VAT. The VATs 130 on the destination disks are updated to indicate the new addresses. After all of the files are moved, the files are copied to the source disk at the new addresses and the VAT 130 on the source disk updated to complete the process.

If a file is required for booting the system, the boot information (stored in the dedicated area of the disk) is updated to indicate the new location for the file on that disk automatically.

While the invention has been described with reference to the structure disclosed, it is not confined to the details set forth, but is intended to cover such modifications or changes as may come within the scope of the following claims.

TABLE I

BOOT SEQUENCE CONTROL-NORMAL BOOT

1. POWER & CABLE CONNECTIONS ARE CHECKED BOTH TO SCANNER 4 & PRINTER 8
2. SYSTEM MEMORY 61 TESTED & INITIALIZED. CHANNEL PROCESSORS 81 PERFORM READS & WRITES TO VARIOUS SECTIONS OF MEMORY 61
3. DISK CONTROLLER MICROCODE IS DOWNLOADED TO DISK CONTROLLER PROCES-

SORS 82 VIA BOOT BUS 92 & BOOT DOWNLOAD CONTROL LOGIC 79
4. IF COLD BOOT, SPIN-UP COMMANDS SENT TO DISK DRIVES 83 (IF WARM BOOT,-CHECKS MADE TO SEE IF ALL DISKS 90-1,90-2, 90-3 ARE SPINNING)
5. CHANNEL LOADER MICROCODE IS SENT VIA BOOT BUS 92 TO PWB 70-10. MICROCODE IS THEN DOWNLOADED USING BOOT DOWNLOAD CONTROL LOGIC 79 TO CHANNEL LOADER/SCHEDULER PROCESSOR 76.
6. CHANNEL LOADER/SCHEDULER PROCESSOR 76 REQUESTS THAT DISK CONTROLLER PROCESSOR 82 RETRIEVE THE CONTROLLER MICROCODE FILE FROM DISK 90-2. DISK CONTROLLER PROCESSOR 82 SHIPS FILE TO MEMORY 61. CHANNEL LOADER/SCHEDULER PROCESSOR 76 THEN DOWNLOADS MICROCODE TO EACH CHANNEL 81 USING BOOT DOWNLOAD CONTROL LOGIC.
7. CHANNEL LOADER/SCHEDULER PROCESSOR 76 REQUESTS THAT DISK CONTROLLER PROCESSOR 83 RETRIEVE THE APPLICATION SOFTWARE LOADER PROGRAM FROM DISK 90-2. DISK CONTROLLER PROCESSOR 83 SHIPS FILE TO MEMORY 61.
8. SCHEDULER MICROCODE IS DOWNLOADED INTO CHANNEL LOADER/SCHEDULER PROCESSOR 76. PROCESSOR 76 WILL NOW PERFORM ONLY AS A SCHEDULER PROCESSOR.
9. APPLICATION SOFTWARE LOADER PROGRAM IS STARTED. APPLICATION SOFTWARE IS RETRIEVED FROM DISK 90-2 & STORED IN MEMORY 61.
10. UI 52, SCANNER4, & PRINTER 8 SOFTWARE IS DOWNLOADED.

We claim:

1. A process for ensuring memory integrity in an electronic printing system in which said memory comprises N disks with files stored on each of said N disks, the N disks being arranged in a preset disk order in the event one or more of said disks is unavailable or replaced, each disk having a bad page table identifying defective disk pages and an allocation table identifying the current location of said files on each of said N disks, comprising the steps of:
   a) providing a permanent processor identifier for said system;
   b) storing copies of said processor identifier on each of said disks to identify the disks that belong with said system;
   c) storing disk location data on each of said disks identifying the physical location of each disk in said memory;
   d) in response to a command to boot said system, determining whether any one of said disks is defective or replaced, said determining step including:
      1) comparing the system processor identifier stored on each of said disks with said system processor identifier, and
      2) comparing the physical location of said disks in said memory with said disk location data stored on said disks;
   e) where the system processor identifier or the disk location for one of said disks does not match with said system processor identifier or said disk location data:
      1) building a list or said files stored on said disks,
      2) sorting said files in said list in accordance with the location of said files on said disks,
      3) building a temporary file allocation table with said list,
      4) allocating new locations to said files on said disks in said temporary allocation table,
      5) marking one of said disks as a source disk,
      6) moving said files on said source disk to the new locations allocated for said files in said temporary allocation table on said other disks,
      7) updating the allocation tables respectively associated with said other disks from said temporary allocation table,
      8) copying files from said other disk to said source disk,
      9) updating the allocation table associated with said source disk, and
      10) erasing said temporary allocation table.

2. The process according to claim 1 including the step of:
   allocating locations for said defective disk pages from said disk bad page table.

3. The process according to claim 2 including the step of:
   allocating the same location on each of said disks for said defective disk pages.

4. The process according to claim 1 including the step of:
   using said allocation table, merging the bad page table for each of said disks with one another to provide a composite bad page table for all of said disks.

5. A process for ensuring memory integrity in an electronic printing system in which said memory comprises N disks arranged in a preset disk order in the event one or more of said disks is unavailable or replaced, each disk having a bad page table identifying defective disk sections, comprising the steps of:
   a) a system boot program on each of said disks;
   b) providing a permanent processor identifier for said system;
   c) storing copies of said processor identifier on each of said disks to identify the disks that belong with said system;
   d) storing disk location data on each of said disks identifying the physical location of each disk in said memory;
   e) in response to a command to boot said system, booting said system from one of said disks;
   f) determining whether said one disk is defective or replaced, said determining step including:
      1) comparing the system processor identifier stored on said boot disk with said system processor identifier, and
      2) comparing the physical location of said boot disk in said memory with said disk location data stored on said disks;
   g) where the system processor identifier or the disk location stored on said boot disk does not match with said system processor identifier or said boot disk location data,
      1) generating a first allocation table, and
      2) using said first allocation table, merging said bad page table for each of said disks including said boot disk with one another to provide a composite bad page table for all of said disks;

h) selecting a second one of said disks as a boot disk;

i) repeating steps e and f;

j) where the system processor identifier and the disk location for said second disk matches with said system processor identifier and said second disk location data, building a second temporary allocation table identifying disk free volume and having file descriptors of each file on said boot disk;

k) re-allocating system files in accordance with said second temporary allocation table by,
   1) relocating system files copied from said boot disk to said other disks based on said composite bad page table,
   2) copying said re-located system files from one of said other disks back to said boot disk,
   3) making said second temporary allocation table permanent, and
   4) deleting said first allocation table.

* * * * *